United States Patent [19]

Ling

[11] Patent Number: 5,046,781

[45] Date of Patent: Sep. 10, 1991

[54] ARRANGEMENT FOR HEIGHT ADJUSTMENT

[76] Inventor: Wei C. Ling, "B" 11/F., 324 Nathan Rd., Kowloon, Hong Kong

[21] Appl. No.: 447,239

[22] Filed: Dec. 7, 1989

[30] Foreign Application Priority Data

Jan. 11, 1989 [GB] United Kingdom ................ 8900591

[51] Int. Cl.⁵ .............................................. A47C 1/02
[52] U.S. Cl. ................................... 297/338; 297/335
[58] Field of Search ............... 297/338, 337, 331, 335; 108/144, 148

[56] References Cited

U.S. PATENT DOCUMENTS

| | | | |
|---|---|---|---|
| 2,843,182 | 7/1958 | Stallard | 297/338 |
| 2,854,063 | 9/1958 | Stallard | 297/338 |
| 2,891,599 | 6/1959 | Stallard | 297/338 |
| 4,148,523 | 4/1979 | Brand et al. | 297/338 X |
| 4,793,655 | 12/1988 | Kualheim | 297/338 X |

*Primary Examiner*—Laurie K. Cranmer

[57] ABSTRACT

The applications of the arrangement of the present invention includes chairs, tables and shelves. Disclosed is a chair having a seat of adjustable height. The arrangement includes a first member or seat having a contact surface for abutting a second member or pair of uprights and means for pivoting the first member with respect to the second member, whereby pivoting first member disjoins the contact surface of the first member from the second member enabling the first member to move longitudinal position with respect to the second member.

3 Claims, 4 Drawing Sheets

ARRANGEMENT FOR HEIGHT ADJUSTMENT

The present invention relates to an arrangement for adjusting the position of a first member with respect to a second longitudinal member and for withstanding a force substantially parallel to the second member. In particular the present invention relates to an arrangement for adjusting the height of the seat of a chair or to an arrangement for adjusting the height of a shelf with respect to its support bracket.

Hitherto chairs enabling the seat to be adjusted have included a screw thread arrangement and a hydraulic arrangement. In general these systems are costly to manufacture and are complex.

Known shelving systems include at least two support bracket members being attached to a wall and at least one pair of brackets for supporting the shelf appending therefrom. The brackets are coupled to the support members by way of slots provided in the support members and a number of hooks provided on the brackets for inserting into the slots. These types of shelving systems do not enable the shelf to be adjusted to any particular height since the height is determined by the position of the slots and the support members.

Furthermore, some shelving systems do not enable the height of the shelves to be moved easily, since the ease of removing the bracket from the support members depends upon the co-operation between the slots and the hooks and which often are over-cooperative.

An object of the present invention is to provide an arrangement for adjusting the position of a first member with respect to a second longitudinal member and for withstanding a force parallel to the second member whilst obviating the aforementioned difficulties.

According to the present invention there is provided an arrangement for adjusting the position of a first member with respect to a second longitudinal member and for withstanding a force substantially parallel to the second member, the arrangement comprising the first member have a contact surface for abutting the second member and for facilitating the arrangement to withstand the force, and means for pivoting the first member with respect to the second member, whereby pivoting the first member disjoins the contact surface of the first member from the second member, enabling the first member to move longitudinal position with respect to the second member.

Generally the contact surface and a surface of the second member provides sufficient frictional force for facilitating the arrangement to withstand the force. Advantageously the contact surface and the surface on the second member may be each crenalleted for correspondence therebetween.

Preferably the means for pivoting comprises a pivot point disposed along a line perpendicular to said second longitudinal member and whereby the end of the contact surface is also disposed along said line.

The first member may be disposed substantially horizontally. The arrangement may be for use with any one of a chair, table or shelf. Also according to the present invention there is provided a chair comprising a seat having a contact surface for abutting a pair of upright members, and means for pivoting the seat with respect to the upright members for enabling the height of the seat to be adjusted. Embodiments of the present invention will now be described, by way of example only, with reference to any one of the accompanying drawings, of which:

Figure 1:
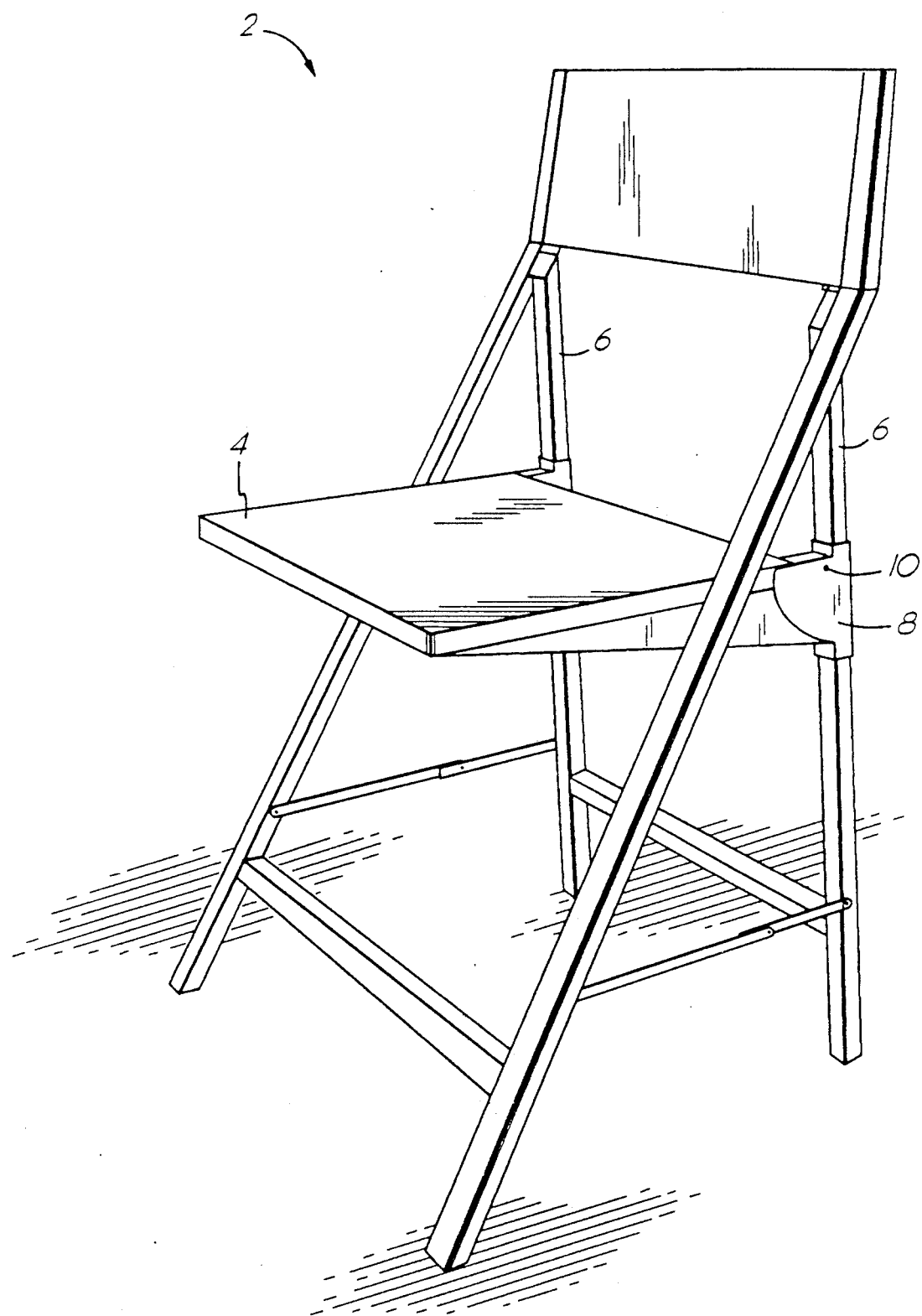
FIG. 1 is a schematic perspective diagram of a chair according to a preferred embodiment.
Figure 2:
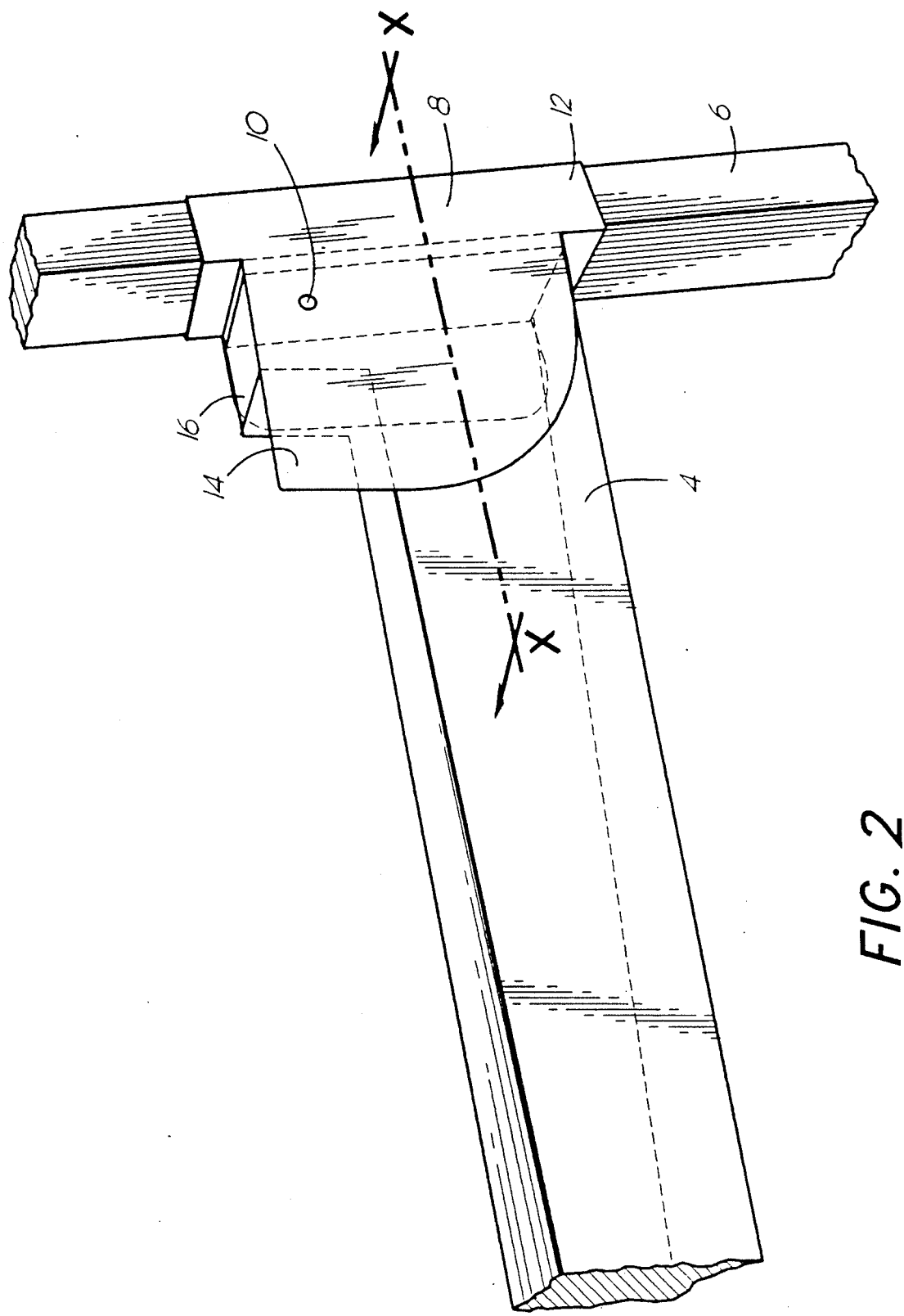
FIG. 2 is a schematic diagram of an arrangement according to the preferred embodiment.
Figure 4:
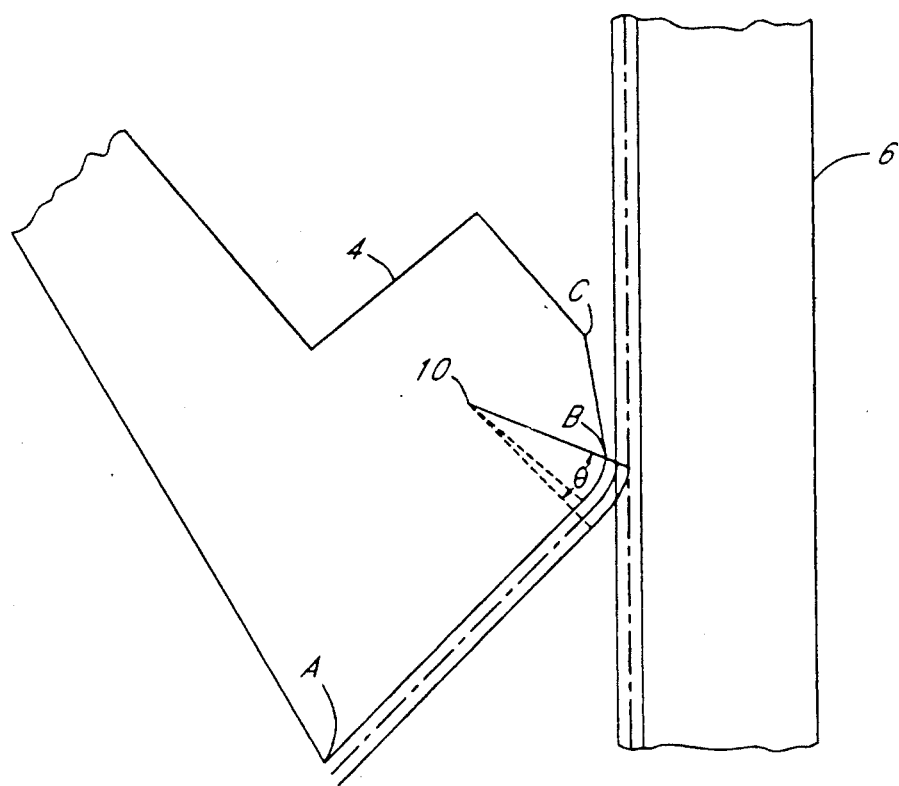
Figure 5:
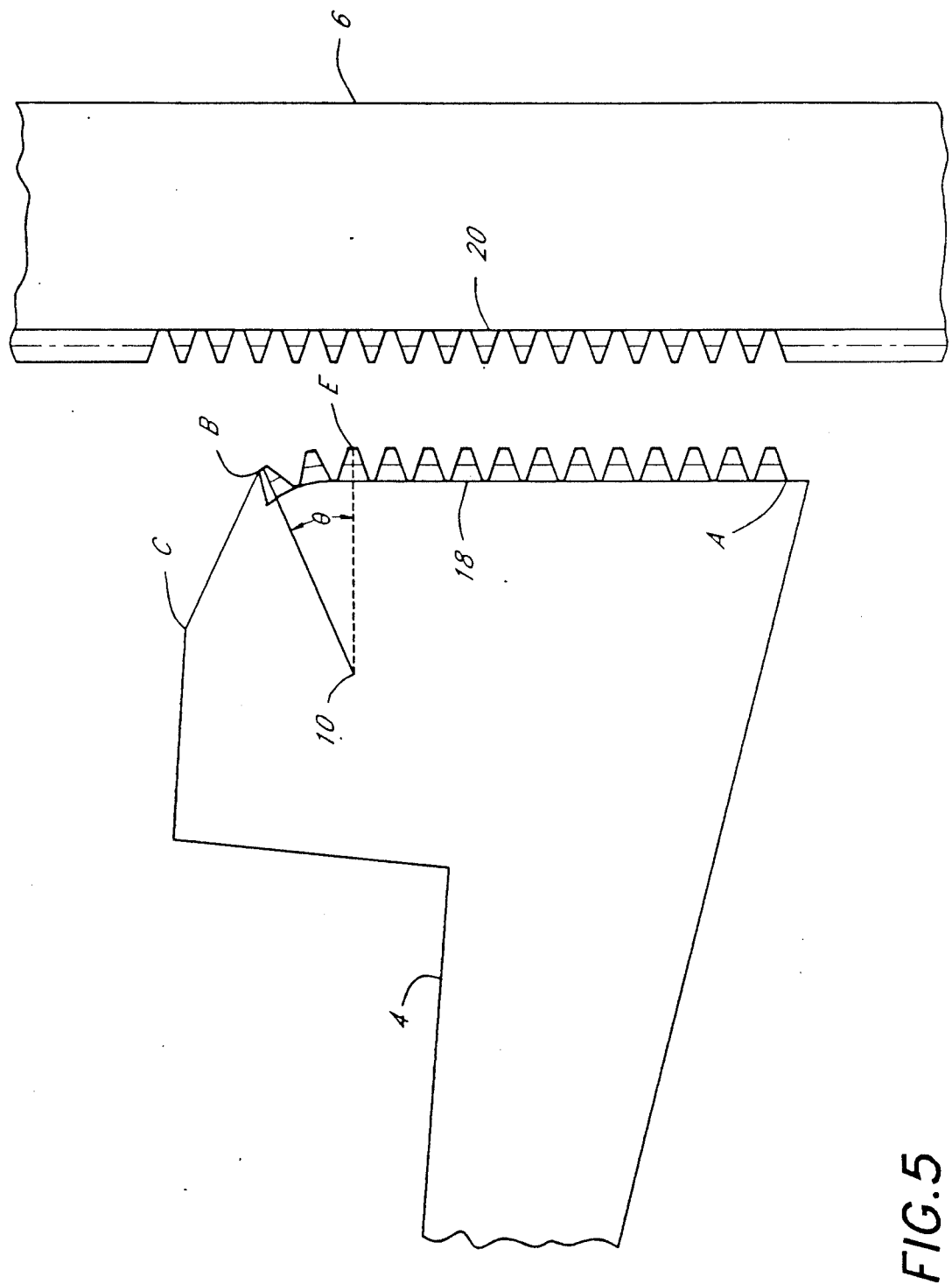

FIG. 4 is a schematic cross-sectional diagram illustrating the first member having been raised; and FIG. 5 is a schematic cross sectional diagram illustrating a contact surface according to a further embodiment of the present invention. A preferred embodiment of the present invention is shown in FIG. 1. The prefered embodiment comprises a chair 2 having a first member or seat 4 coupled to a pair of second members or back support members 6. The seat 4 is coupled to the upright member 6 by way of means 8 providing a pivot point 10. An enlarged and exploded view of means 8 is shown in FIG. 2.

Means 8 includes a sleeve 12 for housing the upright member 6. The sleeve 12 is capable of sliding up and down the support member 6. The pivot point 10 comprises a bolt or rivet or any other suitable means extending through the seat 4. Means 8 is also provided with a pair of flanges 14, 16 for providing protective cover.

Figure 3:
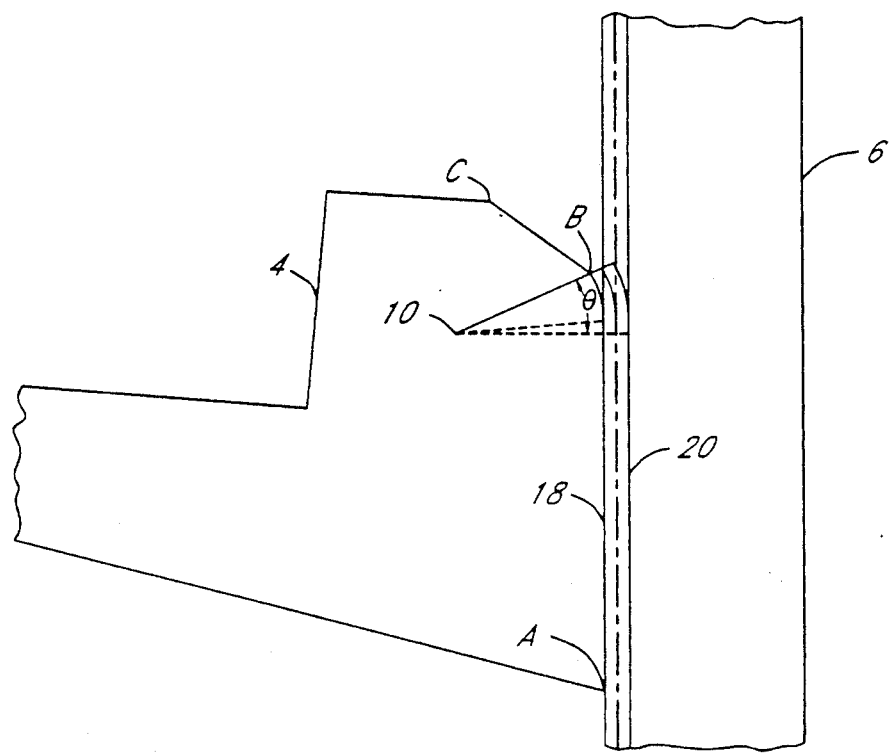
FIG. 3 is a schematic cross section through the plane XX shown in FIG. 2.

The arrangement and operation thereof can more clearly be seen in the schematic cross sectional diagrams illustrated in FIGS. 3 and 4. The seat 4 is provided with a contact surface 18 along AB. Furthermore the upright member 6 may also be provided with a contact surface 20. The contact surfaces 18, 20 must provide sufficient friction such that the weight of the seat 4 or any additional weight thereon enables the seat 4 to remain at a static position with respect to the upright member 6. The greater the downward force on the seat 4, the greater the frictional force between A and B of the contact surfaces 18,20. If the seat 4 is raised and privoted about the pivot point 10 as shown in FIG. 4, the contact surface 18 will be become disengaged from the upright member 6. Accordingly the height of the seat 4 may be adjusted and in the preferred embodiment shown in FIG. 1, the seat 4 may be moved through a range of 40cm. It has been found that the optimum angle $\theta$ for enabling the seat 4 to be raised yet providing adequate frictional force is 30 degrees.

The contact surface 18 and corresponding surface 20 on the upright member 6 must provide suitable friction. This may be achieved in many ways including a roughening of the surfaces 18,20 or having crenellated surfaces as shown in FIG. 5. When the seat 4 is substantially perpendicular to the upright member 6, the crenellations along the surfaces 18 and 20 interlock. This further embodiment shown in FIG. 5 has the additional advantage that if the seat 4 is tilted at an angle 0 less than 30 degrees, then the crenellations along BE are still interlocked with the crenellations on surface 20 and accordingly the seat 4 cannot be moved. This provided a safety function in that if the seat 4 is slightly knocked or moved, then the seat 4 will not fall. When the height of the seat 4 is intended to be adjusted, then the seat 4 must be pivoted through an angle $\theta$ greater than 30 degrees so that the surface BC is then abutting the upright member 6. Since the surface BC is smooth, this enables the seat 4 to be easily moved up and down the upright member 6.

The above arrangement has many applications including chairs, tables, shelves and foldable chairs.

The aforegoing description has been given by way of example only and it will be appreciated by a person skilled in the art that modifications may be made without departing from the scope of the present invention

I claim:

1. An arrangement for adjusting the position of a first member with respect to a second longitudinal member and for withstanding a force substantially parallel to the second member, the arrangement comprising the first member having a contact surface for abutting the second member and for facilitating the arrangement to withstand the force, and means for pivoting the first member with respect to the second member whereby pivoting the first disjoins the contact surface of the first member from the second member, enabling the first member to move longitudinally to a new position with respect to the second member, said pivoting means comprising a pivot point on a line substantially perpendicular to the longitudinal member, an upper end of the contact surface being disposed along the line, the contact surface and the surface of the longitudinal member providing a sufficient frictional force for facilitating the arrangement to withstand said parallel force, said contact surface and the surface of the longitudinal member each being crenellated, for correspondence therebetween, said first member including a flat surface adjacent to said crenellated contact surface, said flat surface being oriented at an angle with respect to said contact surface such that said flat surface can move generally parallel to said longitudinal member when the first member is being moved vertically with respect to said longitudinal member.

2. An arrangement as claim in 1, in which the means for pivoting also includes means for coupling the first member to the second member.

3. The arrangement of claim 1, wherein said first member must be pivoted about 30° in order to separate said crenellated surfaces.

* * * * *